United States Patent [19]

Draper et al.

[11] Patent Number: 5,540,133
[45] Date of Patent: Jul. 30, 1996

[54] LEARNING AIDS

[76] Inventors: Stephen R. Draper, Beech Lodge, 66 Wheatley Drive, Sandsacre, Bridlington, Yorkshire YO16 5UF; Paul Jenkinson, 9 Limekiln Lane, Bridlington, Yorkshire YO15 2LX, both of Great Britain

[21] Appl. No.: 190,081

[22] PCT Filed: Mar. 31, 1992

[86] PCT No.: PCT/GB92/00573

§ 371 Date: Feb. 1, 1994

§ 102(e) Date: Feb. 1, 1994

[87] PCT Pub. No.: WO92/17868

PCT Pub. Date: Oct. 15, 1992

[30] Foreign Application Priority Data

Apr. 2, 1991 [GB] United Kingdom .................... 9106861

[51] Int. Cl.[6] .................................................. G09B 15/02
[52] U.S. Cl. ........................................ 84/471 R; 84/485 R
[58] Field of Search .......................... 84/471 R, 471 SR, 84/485 R, 473, 485 SR

[56] References Cited

U.S. PATENT DOCUMENTS

| 3,379,088 | 4/1968 | Fox | 84/485 |
|---|---|---|---|
| 3,403,591 | 10/1968 | Weitzner | 84/485 |
| 3,827,330 | 8/1974 | Ward | 84/472 |
| 5,386,757 | 2/1995 | Derrick | 84/473 |

*Primary Examiner*—Patrick J. Stanzione
*Attorney, Agent, or Firm*—William A. Drucker

[57] ABSTRACT

A learning aid adapted to be attached to an instrument of the type defined. The learning aid is arranged to lie generally parallel with the fretboard or fingerboard of the instrument and to afford a visual display indicating the string or strings, and the position at which the string or strings are to be depressed against the fretboard or fingerboard to obtain a desired musical note, chord or scale.

10 Claims, 2 Drawing Sheets

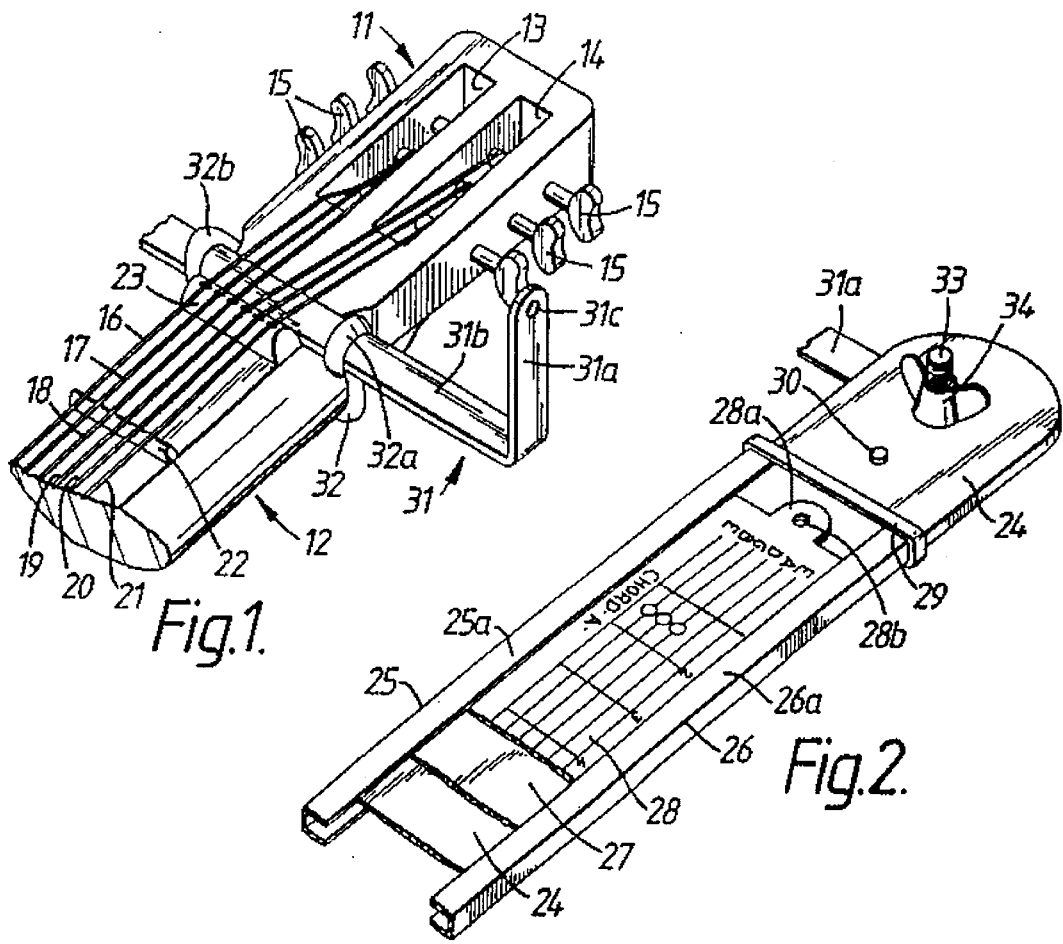
Fig.1.
Fig.2.
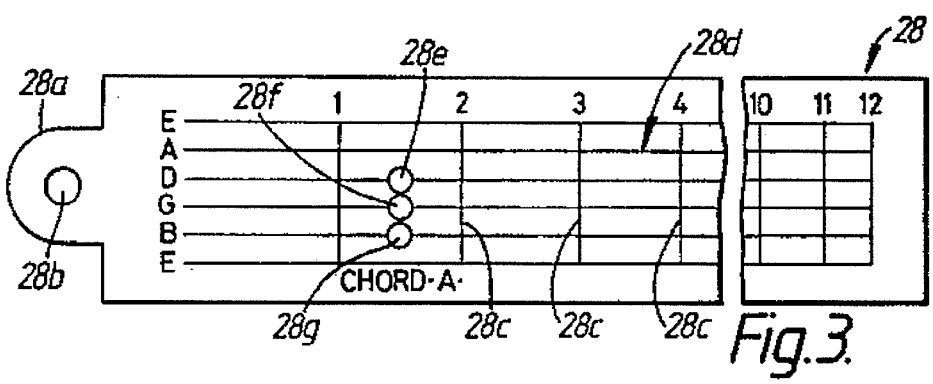
Fig.3.
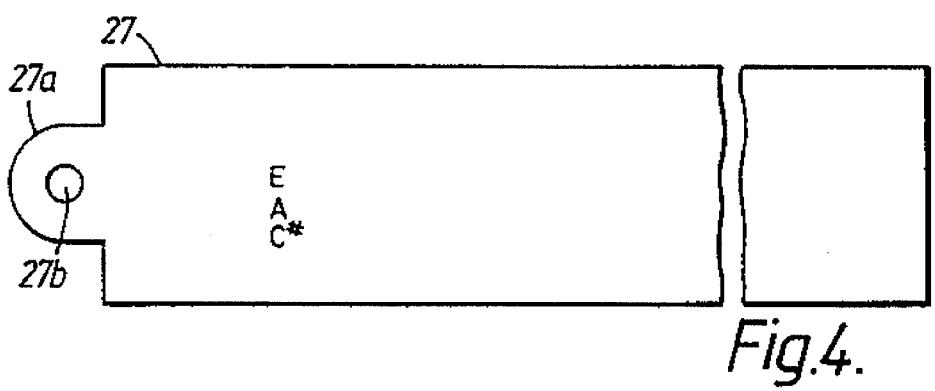
Fig.4.

LEARNING AIDS

BACKGROUND OF THE INVENTION

1. Field of the Invention

This invention relates to learning aids and, more specifically, to a learning aid for string instruments, such as the guitar, violin, fiddle, banjo, cello, base and double base, and wherein the player alters the length of one or more strings by manually depressing the string or strings against a fretboard or fingerboard and manually actuates the shortened string or strings, by plucking, strumming or by playing a bow across the shortened string or strings, to cause said shortened string or strings to vibrate. Such a musical instrument is, hereinafter, referred to as "an instrument of the type defined".

In, for example, the playing of a guitar, the player may play a single string, altering the length of the string as described above before actuating the altered string. Alternatively the player may play a chord, the lengths of the strings to be played for the chord being first selected and depressed against suitable locations on the fretboard after which the selected chord is played. Having played a first string or chord the player will then shorten the strings to be played for the second chord, again by pressing the strings against suitable locations on the fretboard, and those strings are then played.

Thus, for each chord, the player must know in advance which strings are to be used, at what locations on the fretboard the strings have to be manually depressed to give the desired lengths, which fingers are to be used to depress the strings, which strings are to be played and which fingers are to be used to play the strings.

2. Description of the Prior Art

Learning aids, for playing the guitar, are generally in the form of books which, for each chord, identify the location of the points where the strings must be depressed against the fretboard, which finger to use to depress each string, and how to play the strings. However, in the book form, the strings to be actuated for a given chord are illustrated by a simple diagram accompanied by a written description explaining the figure and thus, for each chord to be played, the player must read the text, study the diagram, and then practise the lesson taught for that chord. Such book learning aids are therefore longwinded, tedious and boring.

SUMMARY OF THE INVENTION

The present invention seeks to provide a learning aid for an instrument of the type defined which is convenient, simple to understand, and which is more versatile than learning aids known in the art.

According to the present invention there is provided a learning aid adapted to be attached to an instrument of the type defined, said learning aid being arranged to lie generally parallel with the fretboard of the instrument and to afford a visual display indicating the string or strings and the position at which said string or strings is or are to be depressed against the fretboard to obtain a desired musical note, chord or scale.

Preferably the learning aid displays a plurality of visual displays, there being one visible display for each note, chord or scale to be played, and more preferably the individual visual displays are identified for a desired order of play.

In one embodiment in accordance with the invention, the learning aid comprises a base plate and a top plate arranged to overlie the base plate. The top plate presents a fretboard and strings image, identical with or proportional to the fretboard and string arrangement of the instrument being played, and has a set of apertures therethrough. The apertures pass through the top plate at the locations in the fretboard presented by the learning aid and corresponding to the strings and the locations for pressing the strings to play a desired chord or scale on the instrument.

In such an embodiment, the top plate preferably has a number of sets of apertures in such spaced apart locations that each set of apertures identifies the positions for the strings to be depressed for the strings to achieve a desired chord, whereupon a plurality of chords can be identified and played in a desired sequence.

Preferably the base plate includes a set or sets of letters so located that, when the top plate is in a predetermined longitudinal location on the base plate, a letter is displayed through each aperture in the top plate and each letter identifies the note as would be obtained by playing the string identified on the fretboard image of the learning aid and depressed at the aperture location on the fretboard of the instrument being played.

In another embodiment in accordance with the invention, the learning aid comprises a plate with a fretboard and string arrangement image thereon and illuminating means for identifying the strings to be depressed and the locations at which the strings are to be depressed to play a given note, chord or scale.

Preferably, for such a preferred embodiment, the learning aid includes a memory device arranged to store a plurality of notes, chords and/or scales and the learning aid is arranged to be controlled by the memory device to illuminate the pertinent illuminating means and, when that instruction is played, to extinguish the illuminating sources identifying the instruction and illuminating the sources pertinent to the next instruction to be played.

This may be supplemented acoustically to sound the tone for tuning and/or to play a chord or tune the user is to learn.

Preferably each illuminating source, when illuminated, illuminates a letter pertinent to the note being played by the string when depressed onto the fretboard of the instrument at the illuminated location on the learning aid.

Preferably, the top plate, and, in the case of an illuminated base plate, said base plate, presents a number adjacent each aperture or illuminating source indicating the finger to be used to depress the string of the instrument at the location indicated by the learning aid.

Preferably the top plate is interchangeable with other top plates, each having their respective apertures identifying chords individual to that top plate.

In a further embodiment, the interchangeable top plates are in the form of sheets held within a container such that it can be attached to the learning aid to permit the sheets to be turned over, one at a time, like the pages of a book, thus to permit the user to follow a sequence of musical instruction.

BRIEF DESCRIPTION OF THE DRAWINGS

The invention will now be described further by way of example with reference to the accompanying drawings in which;

FIG. 1 shows, in perspective view, a head of a string instrument of the type defined, FIG. 2 shows, in perspective view, a learning aid in accordance with the invention, FIG. 3 shows a front view of the top plate for the learning aid illustrated in FIG. 2, FIG. 4 shows a front view of a base plate for the learning aid illustrated in FIG. 2.

DETAILED DESCRIPTION OF THE PREFERRED EMBODIMENTS

Figure 5:
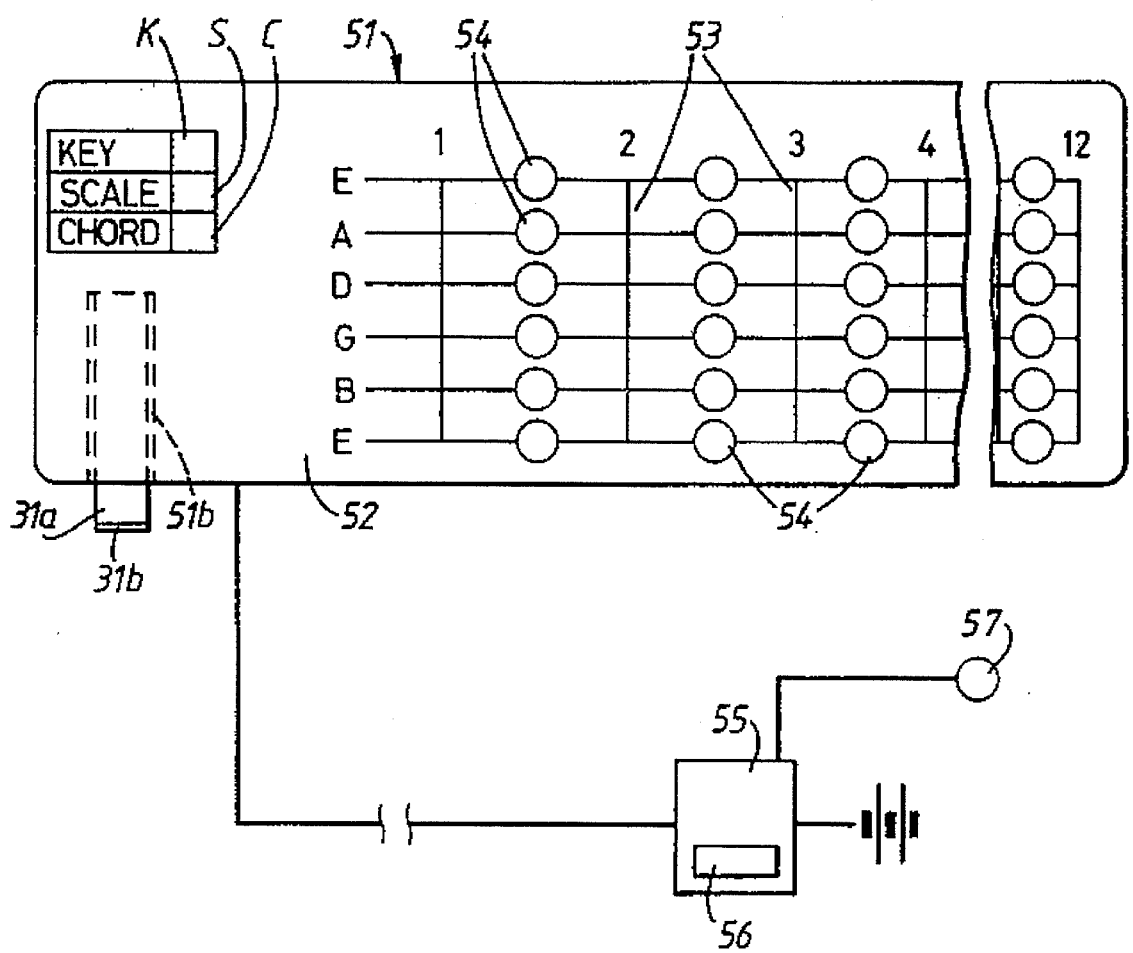
FIG. 5 shows a second embodiment of a learning aid in accordance with the invention.

In FIG. 1 a rectangular "head," 11, sometimes called the "machine head", of a stringed instrument of the type defined blends into the arm 12 of the instrument which extends to the sound box (not shown) of the instrument.

The head 11 includes two vertical slots 13 and 14 in side by side parallel relationship and six string tensioners 15, arranged three on either side of the head 11, extend from the sides of the head 11 into and through the slot 13 or 14 immediately adjacent thereto. Six strings, 16, 17, 18, 19, 20 and 21 extend from anchor locations at or adjacent that end of the sound box remote from the head 11 of the instrument and the strings 16, 17 and 18 extend to the slot 13 and are each wound onto a tensioner 15 individual thereto whilst the strings 19, 20 and 21 extend to the slot 14 and are wound onto a tensioner 15 individual thereto.

The arm 12 of the instrument includes a fretboard comprising upstanding elements 22, arranged transverse to the longitudinal direction of the arm 12 and in spaced apart relationship along the arm 12. Before passing into the slots 13 and 14, the strings 16 to 21 inclusive pass over an elevator bar 23 which has six grooves therein and each of the strings 16 to 21 inclusive is located in a groove in the elevator bar 23 individual thereto. The elevator bar 23 holds the strings 16 to 21 in spaced apart relationship and elevates said strings 16 to 21 out of contact with the fretboard elements 22.

The construction of a machine head for an instrument of the type defined as described above is well known in the art.

The learning aid illustrated in FIG. 2 generally comprises a flat, rigid, elongate support 24 which rigidly supports two channel members 25 and 26 in spaced-apart, parallel relationship. The channel members 25 and 26 have their upper limbs 25a, 26b spaced above the element 24 to allow a base plate 27 and a top plate 28 to be slideably inserted into the channels 25 and 26 and to be longitudinally displaceable therein with respect to the support 24.

The top plate 28 is of generally rectangular form with an extension 28a on one end thereof, the extension 28a including an aperture 28b therethrough, and the top plate 28a has printed on its exposed face an image indicative of the fretboard and strings arrangement of the instrument of the type defined. Thus, the lines 28c are indicative of the frets 22 of the instrument of the type defined and the lines 28d are indicative of the strings of the instrument of the type defined.

The top plate 28 has a plurality of apertures, in the illustrated example three apertures 28e, 28f and 28g, passing therethrough, the apertures 28e, 28f and 28g lying on a common axis passing mid-way between the first and second fret elements identified on the top plate 28, and the apertures 28c, 28f and 28g each having a centre passing through one of the lines 28d indicative of a string 16 to 21.

The base plate 27 is of identical configuration to the top plate 28 and, in like manner to the top plate 28, the base plate 27 includes an extension 27a with an aperture 27b therethrough. In the illustrated example the base plate 27 includes a single column of letters printed thereon and said letters are so arranged that when the top plate 28 overlies the base plate 27 with its side edges and longitudinal edges contiguous, the letters E, A and C" are seen respectively through the apertures 28e, 28f and 28g.

The base plate 27 and the top plate 28 are made from a flexible material, such as paper or card, and the learning aid is assembled by first inserting the base plate 27 between the channels 25 and 26, with the extension 27a leading, and sliding the base plate 27 along the channels 28, under a bridge 29 which extends across the support 24, whereupon the extension 27a can be deflected upwardly to pass over a keep 30, until the keep 30 is firmly located in the aperture 27b of the base 27.

The top plate 28 is fitted in identical manner, being slideably inserted between the channels 25 and 26 with the extension 28a leading, until the leading edges of the top plate 28 pass under the bridge 29 and the aperture 28b can be located on the keep 30. With the top plate 28 and base plate 27 located on the same keep 30 said plates 27 and 28 are accurately aligned.

When the base plate 27 and the top plate 28 have been fully assembled with the support 24, and the keep 30 located in the apertures 27b and 28b, the letters E, A and C" on base plate 27 are exposed through the apertures 28e, 28f and 28g respectively in top plate 28.

The learning aid is assembled with the instrument of the type defined by a bracket 31, which has one limb 31a bent at right angles to a second limb 31b. The bracket 31 is retained with the instrument by a resilient element 32 which has a loop 32a on one end and a loop 32b on its other end.

The bracket 31 is attached to the instrument by passing the free end of the limb 31b through the loop 32a of the element 32, passing the free end of the bracket 31 across the arm 12 of the instrument below the strings 16 to 21 inclusive and between the elevator bar 23 and the slots 13 and 14, and then passing the second loop 32b of the element 32 under the arm 12 and over the free end of the arm 31b of element 31. The flexible resilient element 32 thereby retains the bracket 31 with the instrument without the limb 31b interfering with the strings 16 to 21 inclusive.

The limb 31a of the bracket 31 includes an aperture 31c therethrough, that end of the support 24 opposite to the end at which the top plate 28 and base plate 27 are inserted into the support 24 also includes an aperture (not shown) and the support 24 is attached to the limb 31a of bracket 31 by a bolt 33 which passes through the aperture. 31c and the aperture in the support 24 and has a wing nut 34 secured thereon. Thus, by this means, the learning aid base 24 can be secured with the instrument with the longitudinal axis of the support 24 substantially parallel with the arm 12 of the instrument and with the support 24 and the base plate 27 and the top plate 28 lying in a plane substantially at right angles to that face of the arm 12 having the fret element 22 thereon.

For a six string guitar the strings 16 to 21 inclusive are normally designated the E, A, D, G, B, and E strings respectively, and the lines 28d of the top plate 28 are identified with the same letters, except that, the presentation on the top plate 28 is a mirror image of the string designations; for the instrument. It has been found that, in practise, this presentation is the most convenient, particularly for beginners.

The teaching aid as described above, and having three apertures 28e, 28f and 28g in the mid-position between the first and second fret lines on plate 28 with the said apertures passing through the lines indicative of the strings D, G, and B, and disclosing through the apertures 28c, 28f and 28g the letters E, A and C" respectively, is set to teach the beginner the chord A. Thus, with the learning aid attached to the guitar, a player can readily identify the three strings to be depressed between the first and second fret elements to obtain the chord A and, while so doing, the player will note that the strings being played are the D, G and B strings and will identify through the apertures 28e, 28f and 28g the note each string will play when depressed at the identified position.

Whilst the learning aid has been described above for learning the positions, strings and notes to be achieved by the individual strings, for playing the chord A, it will be appreciated that the top plate 28 may include a second, or more, sets of apertures therethrough, illustrating different chords or scales. In each case, the set of apertures through the top plate 28 will identify the positions at which the strings must be depressed between the frets for a particular chord or scale and will align with a row of letters on the back plate 27 illustrating the notes as would be played by each single string depressed at the identified position.

With the arrangement as described above the top plate 28 and bottom plate 27 can be interchangeable with other top plates 28 and bases 27 having different string, chord, or scale arrangements thereon.

In another embodiment, the base plate 27 may be common to a plurality of top plates 28 and in such case the said base plate 27 will have columns of letters spaced apart longitudinally of the base plate 27 with each column of letters aligned between the indicators for the frets on a top plate 28, and each column of letters will indicate the note as will be played by a string depressed at the identified position of each letter. By virtue of sharing a common keep 30 with the top plate 28, any desired top plate 28, having a plurality of single notes, chords or scales indicated by apertures can be used with the common base plate 27.

In all the above described embodiments, the apertures between adjacent fret elements 22 lie on a common line but, for other embodiments when a cord is to include a sharp or a flat, the aperture for the sharp or flat may be displaced from the common line, to one side or the other, and the base plate 27 may be distinctly coloured to assist the player to readily identify such notes.

In the embodiment illustrated in FIG. 5, a casing 51 presents a front face 52 upon which is printed a representation of the fret positions, indicated by the numeral 53, for the instrument being played and six string positions designated E, A, D, G, B, and E respectively.

A row of six illuminating sources, in the illustrated example (light emitting diodes LED's) 54 are located midway between each adjacent pair of fret indicators 53 and each LED's 54 has its centre on the line indicative of a string E, A, D, G, B, E, individual thereto. The casing 51 is supported from an instrument of the type defined by a bracket, (which may be identical to the bracket 31 illustrated in FIG. 1), and supported by a strop 32, (identical to the strop 32 illustrated in FIG. 1), but in this case the casing 51 includes an internal slot 51b and the free arm 31a of the bracket 31 simply enters into the slot 51b to retain the casing 51 with the instrument.

The learning aid is connected to, and operated by, a computer 55 with a memory arrangement adapted to receive and store a plurality of notes, chord and scale notations. The computer 55 includes a keyboard 56 by which the player can programme the computer 55 to display a plurality of single notes, chords or scales in a predetermined order.

When the computer 55 is driving the learning aid the first note, chord or scale is visually indicated on the learning aid by illumination of the appropriate LED's 54 and the computer 55 may be connected to the instrument by a microphone 57, so that, as each programmed note, chord or scale is played by the instrument, the computer 55 immediately extinguishes the LED's appropriate to that note, chord or scale and illuminates the next instruction on the learning aid.

However, a control may be provided so that a given musical instruction may be repeated.

It will thus be seen that, with this arrangement, and by visually indicating the location or locations at which the strings should be depressed to achieve a desired note, chord or scale, virtually any piece of music can be programmed into the computer 55, via the keyboard 56, and can be played by a beginner holding the instrument for the first time at the speed depending only upon the beginner's ability to identify the illuminated LED's, find the appropriate depression point on the strings, and play the strings.

Each LED will also have printed thereon a letter indicative of the note as would be played by a string depressed at the LED location so that the player quickly learns to identify the notes as playing proceeds.

The front face 52 of the casing 51 may also display other information useful to the beginner and thus, for example, in the illustrated embodiment, the words "KEY", "SCALE" and "CHORD" are associated with panels K, S and C respectively. As the computer 55 transmits each programmed "Play" to the teaching aid the appropriate KEY, SCALE or CHORD is identified by an appropriate legend in the panels K, S and C.

In another method for operating the learning aid illustrated in FIG. 5, and for playing a piece of music when two or more chords are played repetitively in a predetermind order, the computer 55 may illustrate all the chords to be played to assist the player in remembering the chords and the order of play.

Whilst the present invention has been described by way of example with reference to a six string instrument, it will be appreciated that the learning aid can be readily modified for instruments of the type defined having a different number of strings.

Further, whilst the above described examples have been limited to a teaching aid capable of identifying the strings, the position of each string to be depressed for a given note, chord or scale, the note as will be played by a spring depressed at each identified location and an identification of a note, chord or scale being played, the learning aid can be adapted to identify and display other information useful to the player and thus the learning aid may include a visual display adjacent each string depression position to identify the finger to be used to depress a string at a given position.

Figure 6:
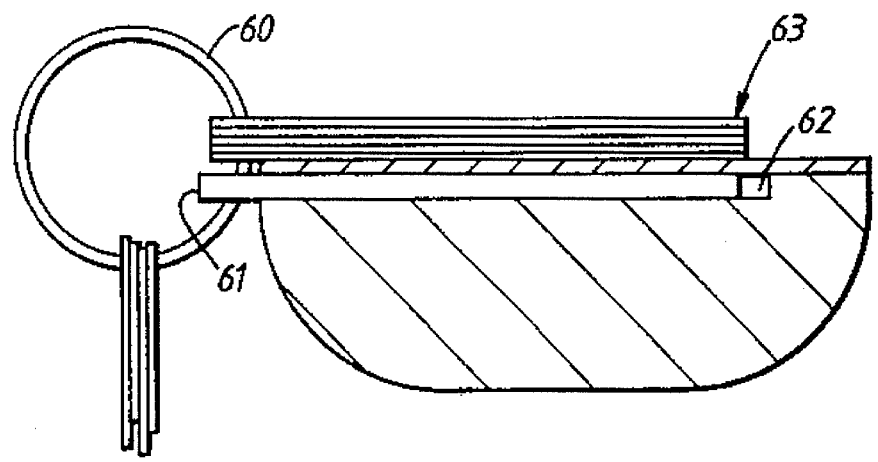
FIG. 6 shows a ring binder containing a number of sheets of musical instruction to be turned over, one at a time, to enable user to follow a sequence of instructions.

In the embodiment of FIG. 6, the ring binder 60 contains a stiff member 61 which slots into a recess 62 in the base plate and permits a number of sheets 63 held in the binder to be turned over, one at a time, to enable the user to follow a sequence of instructions.

We claim:

1. A learning aid, adapted to be attached to a string instrument having a fretboard or fingerboard, and wherein said learning aid is arranged to lie generally parallel with the fretboard or fingerboard of the string instrument and to afford a visual display indicating the string or strings and the position at which said string or strings are to be depressed against the fretboard or fingerboard to obtain a desired musical note, chord or scale, said learning aid comprises a base plate and a top plate arranged to overlie the base plate, said top plate presents said fretboard and strings image and has a number of apertures therethrough, and said apertures pass through the top plate at the locations in the fretboard presented by the learning aid and corresponding to the strings and the locations for pressing the strings to play a desired note, chord or scale on the instrument.

2. A learning aid according to claim 1 wherein said learning aid is removably attached to said string instrument of the type defined.

3. A learning aid according to claim 1 wherein the visual display afforded by the learning aid is identical with, or proportional to, the fretboard or fingerboard of said string instrument.

4. A learning aid according to claim 1 wherein the learning aid displays a plurality of visual displays, there being one visual display for each note, chord or scale to be played.

5. A learning aid according to claim 4 wherein the individual visual displays are identified for a desired order of play.

6. A learning aid according to claim 1 wherein the top plate has a number of sets of apertures in such spaced apart locations that each set of apertures identifies the positions for the strings to be depressed for the strings to achieve a desired chord, whereupon a plurality of chords can be identified and played in sequence.

7. A learning aid according to claim 1 wherein said base plate includes a set or sets of letters so located that, when said top plate is in a predetermined longitudinal location on the base plate, a letter is displayed through each aperture in the top plate and each letter identifies the note as would be obtained by playing the string identified on the fretboard image of the learning aid and depressed at the aperture location on the fretboard of the instrument being played.

8. A learning aid according to claim 1 wherein the aid is capable of providing acoustic information to sound the tone for tuning and/or to play a chord or tune the user is to learn.

9. A learning aid according to claim 1 wherein the top plate is interchangeable with other top plates, each having their respective apertures identifying chords individual to that top plate.

10. A learning aid according to claim 9 wherein the interchangeable top plates are in the form of sheets held within a container such that it can be attached to the learning aid to permit the sheets to be turned over one at a time like the pages of a book, thus to permit the user to follow a sequence of musical instructions.

* * * * *